Jan. 19, 1965   A. E. ANDERSON ETAL   3,166,165
SPEED RESPONSIVE FLUID RELEASED CLUTCH
Filed Sept. 9, 1963   5 Sheets-Sheet 1

INVENTORS:
ARNOLD E. ANDERSON
BY ROBERT E. KAPTUR
ATTORNEYS.

Fig. 4

United States Patent Office 3,166,165
Patented Jan. 19, 1965

3,166,165
SPEED RESPONSIVE FLUID RELEASED CLUTCH
Arnold E. Anderson, Livonia, and Robert E. Kaptur,
Birmingham, Mich., assignors to Ford Motor Company,
Dearborn, Mich., a corporation of Delaware
Filed Sept. 9, 1963, Ser. No. 307,470
6 Claims. (Cl. 192—3.5)

Our invention relates generally to power transmission mechanisms, and more particularly to an automatic clutch system for use in an automotive vehicle driveline.

We contemplate that the clutch system of our invention can be used in combination with a conventional stepped ratio power transmission mechanism for establishing a driving connection between the crankshaft of an internal combustion vehicle engine and a power input shaft for the gearing of the transmission mechanism.

In an automotive vehicle driveline of this type, it is conventional practice to use a selectively engageable friction clutch that is under the control of the vehicle operator for establishing and interrupting a driving connection between the vehicle engine and the transmission power input gear. The clutch normally is engaged during initial acceleration from a standing start by gradually applying pressure to friction disc elements in the clutch structure through the medium of a driver controlled clutch pedal. Speed ratio changes from one ratio to another after the vehicle is under way are accomplished by releasing the friction clutch and sequentially actuating gear motion controlling elements of the gear system by means of a driver controlled gear shift lever mechanism. After the driver interrupts one torque delivery path and establishes another in the gear system by appropriately manipulating the gear shift mechanism, the clutch is re-applied to establish again a driving torque delivery path from the vehicle engine to the torque input member of the transmission mechanism.

The improved clutch structure of our invention is capable of smoothly establishing a driving connection between the vehicle engine and the power input element of the gear system during initial start-up of the vehicle from a standing start. It is capable also of being engaged and disengaged during speed ratio shifts. These functions are accomplished without the need for a driver-controlled clutch pedal.

According to a principal feature of our invention, these functions of the clutch structure are accomplished by means of a semi-automatic control valve system which establishes a smooth clutch engagement characteristic regardless of varying driver demands and driving conditions.

The provision of an improved clutch structure and control system of the type above set forth being a principal object of our invention, it is a further object of our invention to provide a friction clutch mechanism for use in an automotive vehicle driveline wherein provision is made for elminating undesirable reduced torque drag of the clutch friction elements thereby avoiding creep of the vehicle when the gear system is conditioned for torque delivery with the engine idling.

It is another object of our invention to provide a control system for a friction clutch mechanism of the type above set forth wherein the engine speed at which clutch engagement is initiated is higher during the engine warm-up period with the engine idling speed advanced.

It is a further object of our invention to provide a friction clutch and control system in a driveline for an automotive vehicle wherein the final clutch engagement speed under higher engine torque is greater than the corresponding engagement speed at reduced engine torque and wherein the rate of vehicle acceleration is continuous and smooth.

It is a further object of our invention to provide a clutch structure of the type above set forth wherein the clutch engagement time can be controlled to prevent overheating of the clutch friction elements for any given driving torque.

It is a further object of our invention to provide a clutch structure and semi-automatic control system which will perform the foregoing functions and which is characterized further by a negligible degree of power loss due to friction during steady state cruising operation.

It is a further object of our invention to provide a friction clutch and control system of the type above set forth and which does not require special driving skills on the part of the vehicle operator.

It is a further object of our invention to provide a clutch structure which may be employed in a conventional power transmission mechanism with minimum cost and space penalties.

It is a further object of our invention to provide a semi-automatic clutch system having the characteristics set forth in the foregoing paragraphs and which includes friction elements that normally are engaged when the vehicle engine is stalled to make possible so-called push-starts.

For the purpose of describing more particularly the improvements of our invention, reference will be made in the following description and to the accompanying drawings, wherein:

FIGURE 1 shows in longitudinal cross-sectional form a power transmisison mechanism capable of being used with our improved clutch system;

Figures 1, 5:
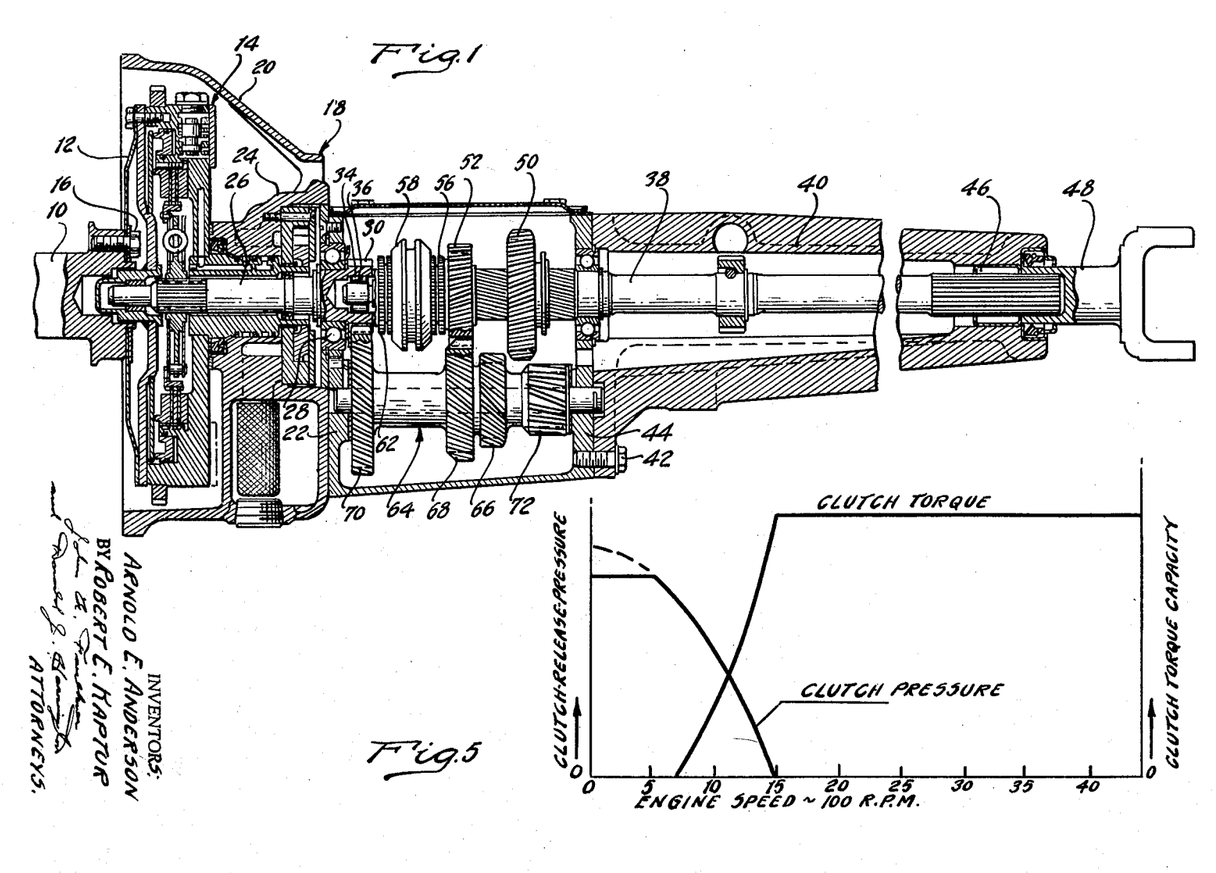

Referring first to FIGURE 1, the engine crankshaft for an internal combustion vehicle engine is designated by reference character 10. It is connected by means of a drive plate 12 to the periphery of an automatic take-up clutch mechanism generally identified by reference character 14. The hub of drive plate 12 is bolted by bolts 16 to a flange formed on the crankshaft 10.

A transmission housing indicated generally by reference character 18 includes a bell housing portion 20 and a main housing portion 22. The rotary portions of the automatic take-up clutch structure are journalled within a separating wall 24 disposed between the housing portions 20 and 22. The driven portions of the clutch structure are connected to a power input shaft 26 which is journalled by means of a bearing 28 within an opening formed in the wall 24. A power input gear 30 is connected to the rearward end of shaft 26.

An intermediate torque delivery shaft 32 is piloted by means of bearing 34 within an opening 36 formed in the end of shaft 26. A power output shaft 38 is connected to the shaft 32 and extends rearwardly through a transmission tailshaft extension housing 40, the latter being secured by bolts 42 to a rearward end of wall 44 of the housing portion 22. Shaft 38 is journalled by means of bearings 46 at the rearward end thereof. It is splined to an internally splined universal joint yoke 48 which forms a part of a driveline for the vehicle traction wheels.

A low and reverse gear 50 is slidably splined upon shaft 32. It is incapable, however, of rotating relative to shaft 32 although axial sliding movement thereon is accommodated.

An intermediate speed ratio gear 52 is rotatably journalled upon a bearing portion 54 formed on shaft 32. It includes synchronizer clutch teeth 56 situated adjacent a synchronizer clutch sleeve 58 having internal clutch teeth that engage the teeth 56 when it is shifted in a right hand direction as viewed in FIGURE 1. Sleeve 58 is slidably carried by an externally splined hub 60 which in turn is secured by splines to the shaft 32.

As the sleeve 58 is shifted in a left-hand direction, as viewed in FIGURE 1, its clutch teeth engage drivably clutch teeth 62 carried by power input gear 30. Thus, as sleeve 58 is shifted in a left-hand direction, a direct connection is established between shaft 26 and shaft 32.

The cluster gear assembly is identified generally by reference character 64. It includes a low speed ratio gear element 66, an intermediate speed ratio gear element 68 and a power input gear element 70. These gear elements are adapted to mesh respectively with gears 50, 52 and 30. A reverse gear element 72 also is formed on cluster gear assembly 64. It is adapted to mesh with a reverse drive pinion which in turn may engage gear 50 when the latter is shifted in a right-hand direction to establish reverse drive operation.

First speed ratio operation is obtained by shifting gear 50 in a left-hand direction into meshing engagement with gear element 66. Synchronizer clutch sleeve 58 assumes the neutral position shown. Engine torque then is delivered through the automatic take-up clutch to gear 30. The cluster gear assembly 64 is driven by the gear 30, so that gear element 66 will drive gear 50 and the power output shaft 38 at a reduced speed.

Second speed ratio operation is accomplished by shifting the gear 50 to the position shown and by shifting the sleeve 58 in a right-hand direction. Under these circumstances, the driving torque applied to gear 30 will pass through gear element 70, gear element 68, gear 52 and shaft 32 to the power output shaft 38.

To establish high speed ratio operation, gear 50 assumes the position shown and sleeve 58 is shifted in a left-hand direction. Thus the power input torque is distributed directly to the shaft 32 and hence to the power output shaft 38.

Reverse drive operation is accomplished by shifting the sleeve 58 to the neutral position shown and by shifting the gear 50 in a right-hand direction and into meshing engagement with the reverse idler pinion not shown. Thus, the driving torque of the gear 30 is transmitted through gear element 70, gear element 72, the reverse drive pinion, gear 50, shaft 32 and the power output shaft 38.

Figure 1A:
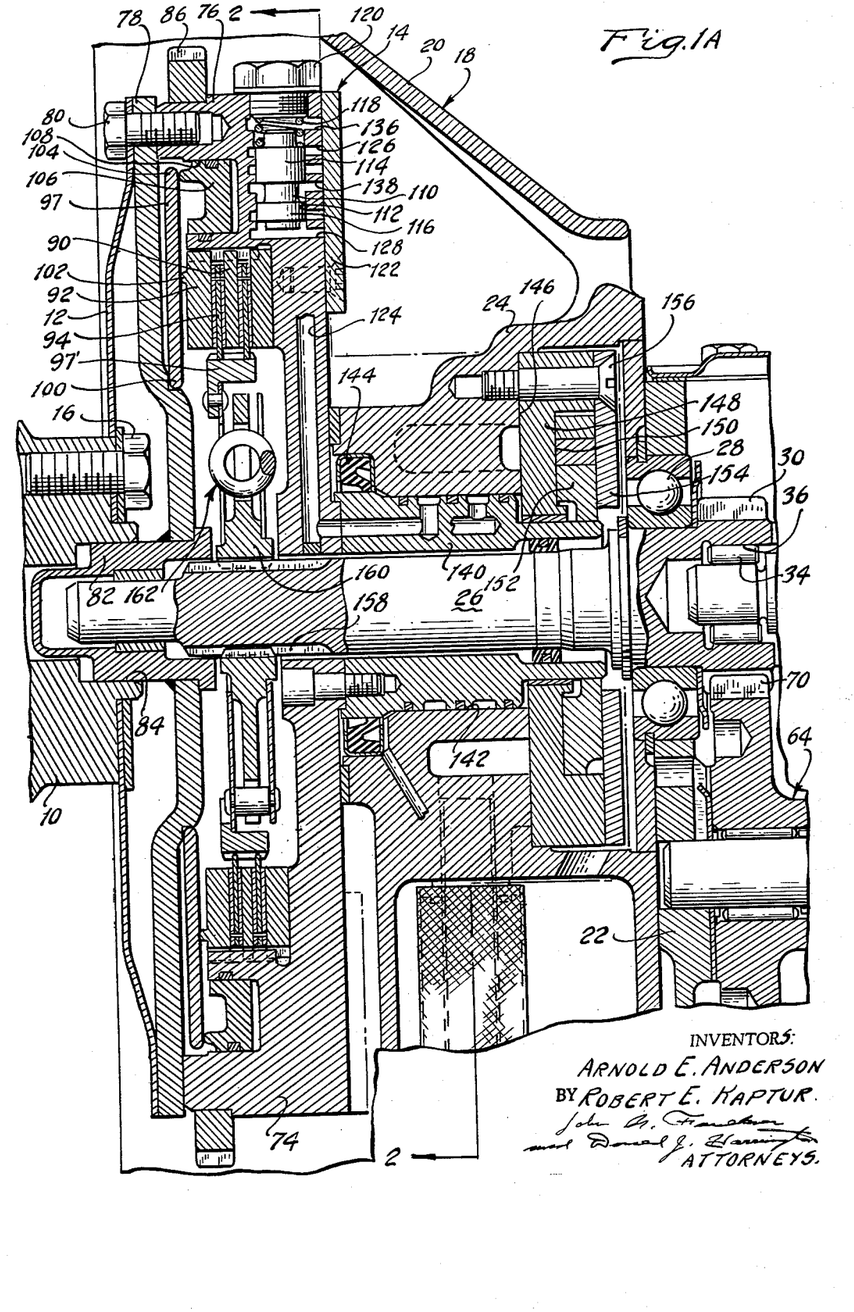
FIGURES 1A and 1B are enlarged views of the clutch structure used with the mechanism of FIGURE 1.

The automatic take-up clutch structure 14 includes a fly-wheel in the form of a clutch housing 74. It is bolted at its outer periphery 76 to a clutch plate 78, suitable bolts 80 being provided for this purpose. The hub of plate 80 is welded to a pilot element 82 which in turn is received within a pilot opening 84 formed in the end of crankshaft 10. An engine starter ring gear 86 is carried about the periphery 76 for the housing 74.

Housing 74 is in the form of a drum and includes an internally splined inner periphery 88 which carries externally splined clutch discs 90. A clutch pressure disc 92 also is splined to the periphery 88 as indicated.

Internally splined discs 94 are carried by an externally splined clutch element 97'. The discs 94 and 90 normally are urged into frictional driving engagement by means of a Belleville washer spring 98 which is anchored at its inner periphery 100 upon a cooperatingg shoulder formed in the plate 78. An intermediate portion of the spring 97 engages a projection 102 formed on the pressure disc 92. The outer periphery 104 of the spring 97 is engaged by an annular piston 106 which is received within an annular cylinder 108. Fluid pressure may be admitted to the annular chamber defined by piston 106 and cylinder 108 in a manner that will be described subsequently. Suitable internal passage structure and a governor valve assembly are utilized in controlling the operation of the piston 106.

It will be apparent that if the piston 106 is shifted in a left-hand direction, the spring loaded clutch discs 90 and 92 will become disengaged. But if the pressure chamber defined by the cylinder 108 and the piston 106 is exhausted, the friction clutch disc assembly is applied.

The governor valve assembly includes a governor valve spool 110 which is slidably positioned within a governor valve chamber 112. Spool 110 is formed with valve lands 114 and 116. A valve spring 118 normally urges the spool 110 radially inwardly. It is seated upon a threaded spring seat member 120 which is threadably received within the radially outward end of the chamber 112.

A valve cover plate covers the valve assembly. Plate 122 cooperates with cored passages in the drum 74 to define pressure distributor lines which may best be seen by referring to FIGURE 2. A fluid pressure passage 124 extending to the annular cylinder 108 communicates with a groove 126 located at the outer edge of the spool valve land 114. It communicates also with a groove 128 situated at the inner edge of the land 116.

Figure 2:
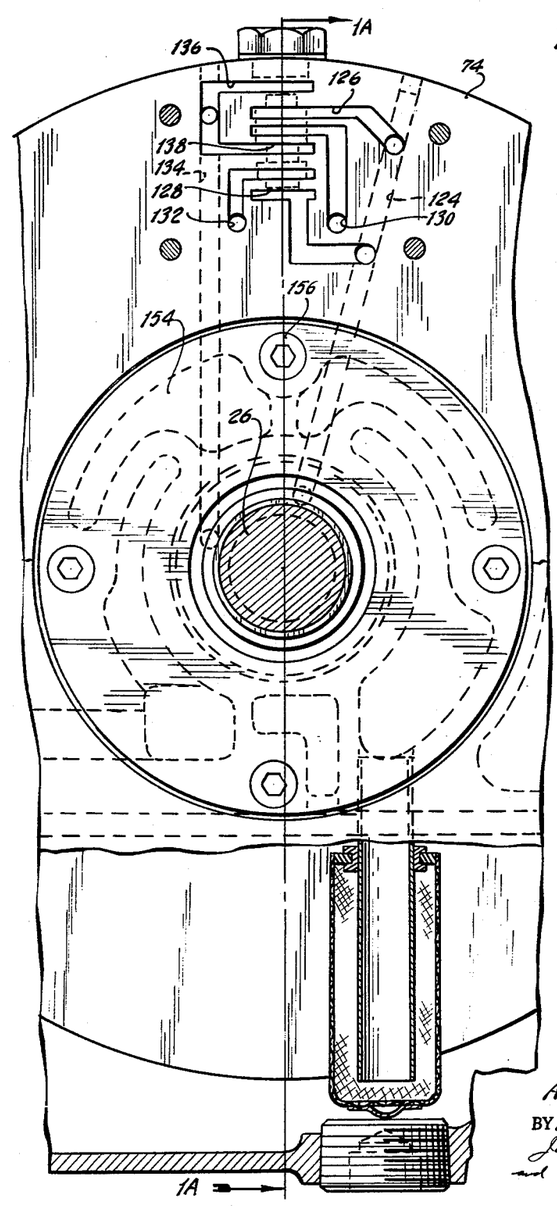
FIGURE 2 is a transverse cross-sectional view taken along the plane of section line 2—2 of FIGURE 1A.

Lubrication oil passages are shown at 130 and 132. Another pressure distributor passage 134 formed in the drum 74 communicates with valve grooves 136 and 138 formed in the chamber 112.

The passages 124 and 134 extend radially inwardly and communicate with axially extending passages formed in a hub 140 which is journalled within an opening 142 in the wall 24. A fluid seal 144 surrounds the hub 140 and is located in the forward end of the opening 142.

Figure 1B:
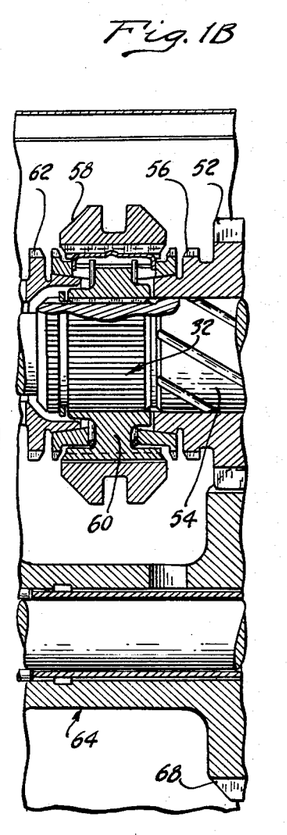

Wall 24 defines a pump chamber 146 which receives a pump body 148 having a pump chamber 150. Pump gear elements 152 are located within the chamber 150. A cover plate 154 is secured to the body 148 and cooperates with the chamber 150 to define fluid pump cavities. Screws 156 secure the plate 154 and the body 148 to the wall 24.

The gear elements of the pump are drivably connected to the rearward end of the sleeve 140 so that the pump is in operation whenever the engine is running. The central power input shaft, as previously indicated, is shown at 26. It is splined at 158 to a clutch element 160. This element is coupled to clutch element 96 by means of a damper spring assembly of conventional design. The spring assembly is indicated generally by reference character 162.

Figure 3:
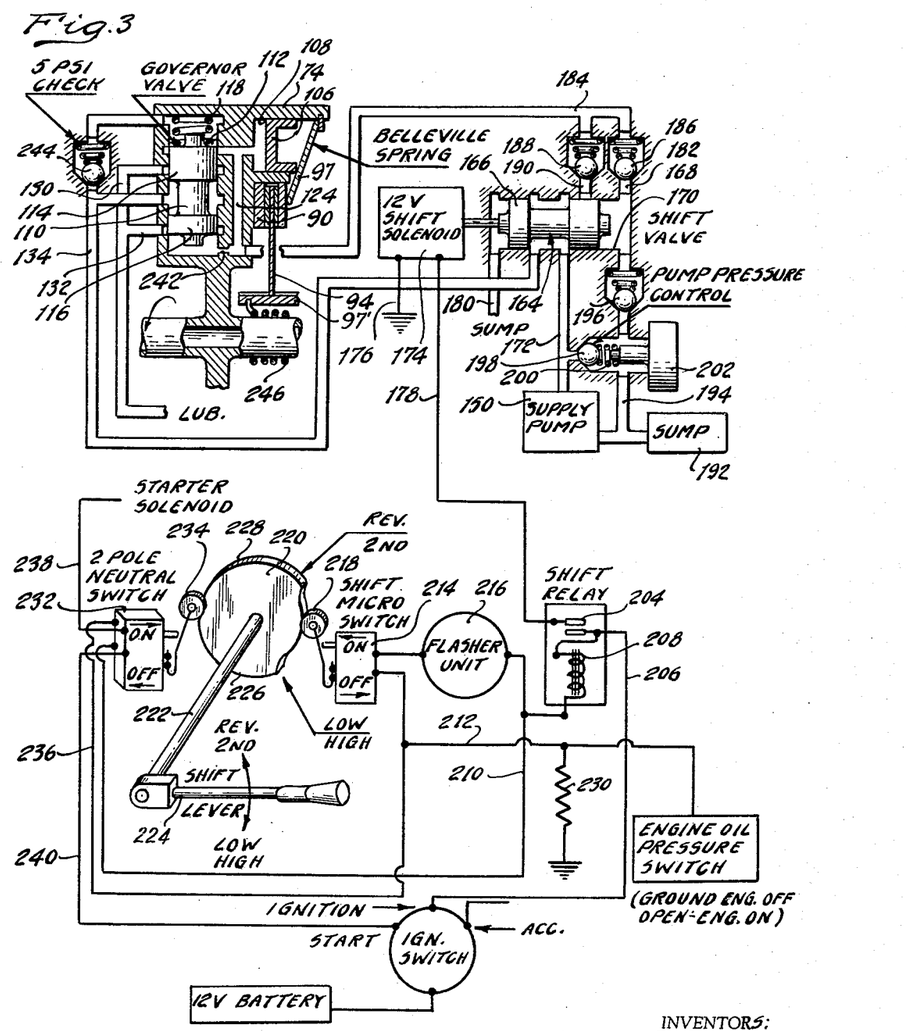
FIGURE 3 is a schematic diagram showing a semi-automatic control valve system for the clutch structure of FIGURE 1.

A description of the mode of operation of the structure of FIGURES 1, 1A, 1B and 2 can best be obtained by referring to FIGURE 3. The distribution of pressure to the governor valve is controlled by a shift valve which is indicated generally by reference character 164. It includes a valve spool having spaced valve lands 166 and 168 located within a valve chamber 170. A pressure supply passage 172 extends from the supply pump to the valve chamber 170 at a point intermediate the spaced valve lands 166 and 168.

Valve 164 may be shifted within the chamber 170 by means of a solenoid operator 174. This operator includes a solenoid coil which is grounded through a ground line 176 and which is energized by a voltage supply line 178. When the operator 174 is energized, the shift valve 164 will be shifted in a right-hand direction, thereby causing the land 166 to block passage 134. When the operator 174 is de-energized, the shift valve assumes a left-hand position so that communication is established between passages 172 and 134.

The left-hand end of the valve chamber 170 communicates with the low pressure sump through an exhaust passage 180. Communicating with the right-hand end of the chamber 170 is a passage 182 which communicates with a clutch pressure feed passage 184 through a one-way check valve 186. This valve normally is urged to a closed position by its associated valve spring. It permits flow from passage 182 to passage 184, but flow in the opposite direction is prevented. It is situated in parallel relationship with respect to a second check valve 188 located in a by-pass passage 190.

Passage 190 establishes flow from valve chamber 170 to passage 184, but flow in the opposite direction is inhibited. Valve land 168 blocks passage 190 when the shift valve assumes the left-hand position shown in FIGURE 3, but it is uncovered when the shift valve is actuated by the operator 174. The right-hand end of the valve chamber 170 communicates with the transmission sump 192 through a low pressure supply passage 194 within which is situated a one-way check valve 196 for allowing fluid transfer sump 192 to the valve chamber 170 and inhibiting flow in the opposite direction.

The supply pump is adapted to distribute pressure to passage 172, a portion of the pump discharge fluid being by-passed to the passage 194 through a one-way check valve 198. This valve includes a valve element that is acted upon by valve spring 200. Thus the pressure maintained in passage 172 is dependent upon the calibration of the valve 198. The effective spring pressure of the spring 200 can be changed by a suitable temperature responsive transducer 202 which is adapted to vary the spring tension of spring 200 as the operating temperature of the engine changes. Upon a decrease in the engine temperature, the transducer 202 causes an increase in the load of spring 200, thereby raising the regulated pressure level of the fluid in passage 172. An increase in the operating temperature, however, will cause a decrease in the spring pressure, thereby allowing the effective regulated pressure level to decrease.

Line 178 communicates with a shift relay valve having a set of electrical contacts 204 which establish and interrupt a connection with line 206. A source of electrical potential such as a vehicle battery used for ignition purposes, is connected to the line 206 through an ignition switch. The connection is completed when the ignition switch is turned to the ignition position indicated.

The contacts 204 are opened by a solenoid unit 208 as the latter is energized. The solenoid coil is connected at one end to line 206 and the other line is connected to a line 210. A ground line 212 may be grounded through an engine oil pressure switch which is open while the engine is operating, but grounded when the engine is inactive. Line 212 is connected to line 210 through a shift micro-switch 214 and an electrical potential pulse unit 216. This may be in the form of a flasher unit which connects and disconnects the circuit of line 210 in cyclic fashion.

The shift micro-switch normally assumes a closed condition. It may be opened, however, by means of a cam follower 218 as the latter is shifted in a right-hand direction as viewed in FIGURE 3. Follower 218 engages a cam 220 which can be rotated by means of a cam shaft 222. This shaft may function also as a gear shift shaft. One end of shaft 222 is connected to a shift lever 224 which is under the control of the vehicle operator. The synchronizer clutch sleeves in the transmission gear system are linked to lever 224. The lever 224 may be shifted in a clockwise direction from an intermediate neutral position to establish low speed ratio operation or high speed ratio operation. It may be shifted in a counter clockwise direction from a neutral position, however, to establish reverse drive operation or second speed ratio operation.

When the lever 224 is shifted to the positions corresponding to low speed ratio operation and high speed ratio operation, cam follower 218 engages a high portion 228 of the surface of cam 220. When it assumes the positions corresponding to reverse and second speed ratio operation, follower 218 engages a high portion 226 of the cam 220. This again causes the shift micro-switch to become opened. When the gear shift lever assumes a neutral position, however, the follower 218 moves in a left-hand direction to cause the micro-switch to close.

A resistor element 230 is situated in parallel relationship with respect to the engine oil pressure switch and is connected between line 212 and the ground. A two-pole neutral switch 232 normally assumes a closed condition, but it may be opened by a cam follower 234 as the latter is shifted in a left-hand direction. Cam follower 234 engages the high portions 228 and 226 of the surface of cam 220 to open the neutral switch as the shift lever is moved in either a clockwise direction or a counter-clockwise direction from the neutral position. When the shift lever assumes the neutral position, however, the follower 234 engages the low portion of the cam surface, thereby allowing the neutral switch to close.

The neutral switch establishes a connection through line 210 between one side of the solenoid coil and a line 236 which is connected to the ground line 212. The neutral switch establishes and interrupts a connection also between an engine starter motor solenoid circuit which includes lines 238 and 240. The ignition switch also forms a part of this circuit and is adapted to close the same as it is moved to the start position indicated in FIGURE 3.

A clutch re-engagement orifice 242 is situated between passage 124 and the radially inward end of the governor valve chamber 112. It is effective to drain high pressure fluid from the annular cylinder 108 when the engine speed is relatively high.

During operation of the control system of FIGURE 3, it is necessary to condition the transmission mechanism initially for neutral before the engine can be started. The clutch structure shown in part at 90 and 94 thus must be fully disengaged. If the gears of the transmission gear system are loaded, such as they are when the vehicle is parked on a grade, the shift lever cannot be shifted readily to the neutral position. The neutral clutch, however, will release the torque on the gears to permit the shifting movement to take place. In order to release the clutch the operator shifts the lever 224 initially toward a neutral position. The initial movement will cause the cam follower 218 to move to the low portion of the surface of cam 220, thereby causing the micro-switch 214 to close. This completes an electrical circuit for the shift relay solenoid unit 208. Current then flows from the battery through the ignition switch, through the shift relay solenoid unit, through the flasher unit 216, through the shift micro-switch and through the ground line 212, the latter being grounded through the engine oil pressure switch as explained previously. The flasher unit then will become energized to cause cyclic operation of the shift relay as the circuit is opened and closed by the flasher unit. The shift solenoid then will cause the shift valve to shift with a pumping motion within the valve chamber 170. The shift valve thus acts as a fluid pump as fluid is drawn through the one-way check valve 196 from the sump and delivered through the one-way check valve 186 to the passage 184. Pressure then will be delivered by the shift valve through passage 124 to the annular cylinder 108 to cause release of the friction clutch structure. This pumping action continues until the clutch is fully disengaged and the shift lever is moved fully to the neutral position. When the shift lever assumes this position, follower 234 is caused to engage the low portion of the surface 220, thereby causing the neutral switch to close. The current passing through the shift release solenoid unit then is by-passed through line 210 and through the neutral switch to the line 240. It then passes through the ground line 212. The flasher unit then is short circuited and the pumping action of the shift valve ceases.

The engine may be started only when the shift lever assumes a neutral position since only then is the neutral switch closed to permit a complete circuit from the battery to the starter solenoid. As soon as the engine is started, the supply pump is effective to deliver pressure since it is connected directly to the engine crankshaft.

Pressure then is distributed from passage 172 through the shift valve to the passage 134. It passes a one-way check valve 244 in the passage 134 to the upper end of the governor valve spool 110. Fluid pressure then passes directly into the annular cylinder 108. The engine oil pressure switch also opens as soon as the engine is started and begins to develop lubricating oil pressure. Current to the shift relay solenoid unit 208 then must pass through the resistor 230 which is connected in parallel with respect to the engine oil pressure switch. The current flow through the shift relay then is reduced and cyclic operation of the flasher unit is prevented.

The operator may shift the transmission from one speed ratio to the other by employing the shift lever 224 in the usual fashion after the clutch is disengaged. The final motion of the gear shift lever as it is shifted to any one of the drive range positions causes the cam follower 218 to ride over the high portion of the surface of cam 220, thereby opening the micro-switch 214. This releases the solenoid unit 208 and the shift solenoid.

The vehicle may be accelerated from a standing start by allowing the clutch shown in part at 90 and 94 to engage. Start-up is accomplished simply by advancing the engine carburetor throttle. As the engine speed increases, the clutch torque increases also until an equilibrium engine speed is achieved. This speed is maintained until the clutch engages. The engagement characteristic can best be understood by referring to FIGURE 4, wherein we have plotted engagement time against rotational velocity for each of three engine carburetor throttle settings. A clutch point occurs at the intersection of the curves for the output speed and the engine speed.

Figure 4:
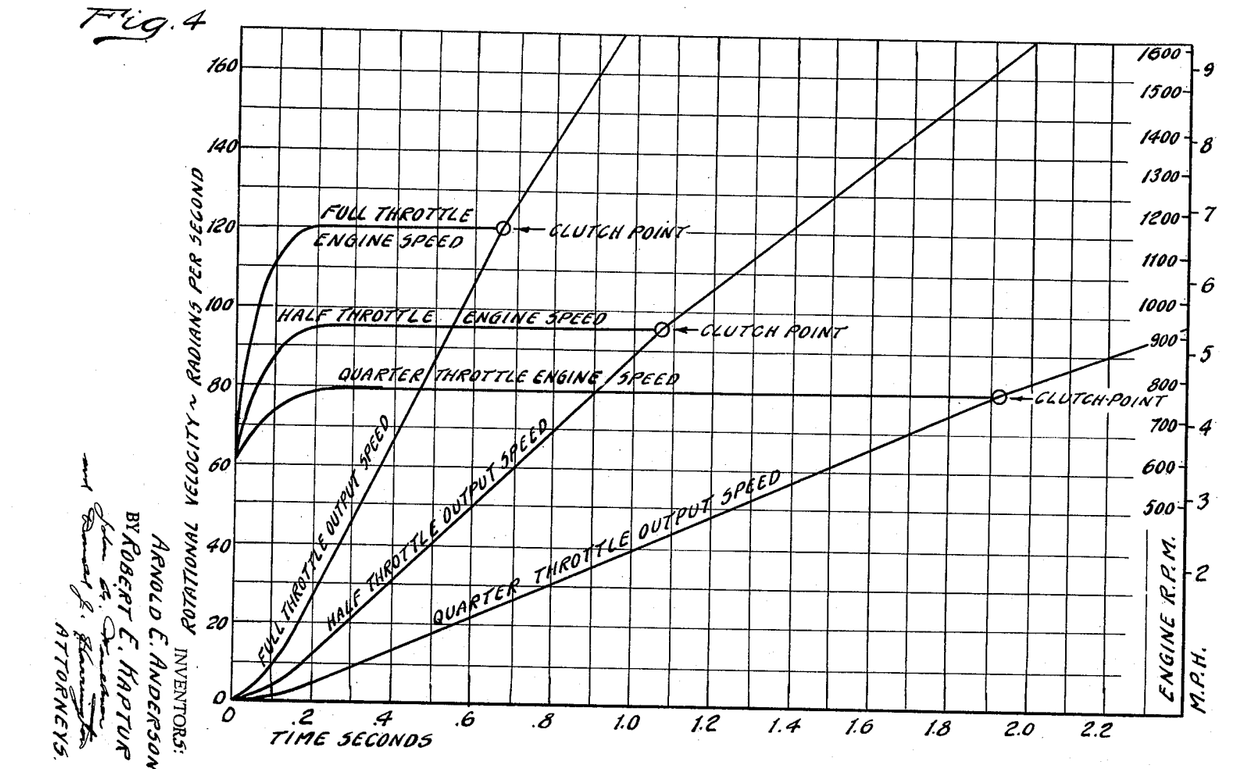
FIGURE 4 is a chart showing the clutch engagement time for any given engine throttle setting; and, FIGURE 5 is a chart showing the relationship between clutch torque and clutch release pressure during the clutch engagement interval.

The shape of the engine speed curve can be changed somewhat if a friction lining material having a modified friction coefficient is employed. In some instances, the friction coefficient can be decreased as the clutch engaging pressure increases. The engine speed curve then will rise somewhat during the final stages of the clutch engagement period.

It is possible to establish smooth clutch engagement with no possibility of a sudden increase in engine speed as the throttle is advanced prior to engagement of the clutch. This is done by causing clutch engagement to be initiated at a relatively low speed which may be only slightly higher than idle speed.

At idling engine speeds, communication is established between the annular cylinder 108 and the pressure distributor passage 134 through the check valve 244. Under these conditions the pressure is sufficient to cause a pressure force upon piston 106 that will overcome the force of spring 98 thereby releasing the clutch. As the vehicle engine is accelerated, the centrifugal force acting upon the governor valve spool 110 will cause the latter to move in a radially outward direction thereby progressively restricting the degree of communication between annular cylinder 108 and low pressure oil passages 130 and 132. The pressure force, the centrifugal force, and the force of spring 118 thus control the radial position of the valve spool 110. These balanced forces thus control the rate of pressure build-up in the cylinder 108. If the engine is accelerated, for example, with the throttle at a wide open setting, the engine speed will increase to a value corresponding to the so-called "clutch point" in a relatively short time. In contrast, if the engine is accelerated with a part throttle setting, the clutch point will be reached after some delay. This characteristic is illustrated best in FIGURE 4.

After the vehicle is under way, shifting from one ratio to the other is accomplished by appropriately manipulating the shift lever 224. The initial motion of the lever 224 will cause the cam follower 218 to engage a low portion of cam 220. This closes the shift micro-switch to reactivate the shift solenoid. The circuit for the solenoid unit of the shift relay is completed as before since the flasher unit 216 and the close shift micro-switch establish a connection between one side of the shift relay solenoid coil and the ground line 212. This causes the shift valve to move in a right hand direction. Pump supply pressure then can pass directly from passage 172 and through passage 190 to the passage 184. The check valve 188 permits this to occur. The annular cylinder 108 then is pressurized directly by the supply pump.

The transmission mechanism then can be shifted in the usual fashion. The final motion of the shift lever 224 again opens the shift micro-switch to release the shift solenoid since the circuit for the solenoid unit of the shift relay again is interrupted. The shift valve again moves to the left hand position as shown in FIGURE 3, so that the pressure in passage 172 is transferred to passage 134. If the upper end of land 114 then is pressurized, the governor valve then will function as explained previously to control the re-engagement of the neutral clutch.

If the engine throttle is closed during such a shift sequence, it is possible that the engine speed might fall to a value which would be too low to cause re-engagement to occur. Under these conditions, the governor valve would assume a radially inward position and cause a direct connection from passage 134 to the annular cylinder 108. We therefore have provided a spring clutch mechanism 246 which surrounds the central clutch shaft within the power input shaft 26. The clutch is in the form of a coil spring, one end of which is connected to the shaft 126. The spring convolutions are wrapped around the central shaft. If the central shaft rotates at a speed that is equal to or greater than the speed of shaft 26, the clutch mechanism 246 will simply overrun. If, however, the shaft 26 tends to overrun the central shaft under those conditions in which the vehicle engine speed is very low, the spring clutch mechanism 246 will establish a frictional driving connection between the central shaft and the power input shaft 26. The reverse torque capacity of the clutch 246 is sufficient to cause an increase in the engine speed so that re-engagement of the neutral clutch may occur. Whenever the engine speed is greater than the output speed, the governor valve assembly will control engagement of the clutch.

Under some circumstances, the governor valve assembly may completely interrupt communication between passage 134 and the annular cylinder 108. Under these conditions re-engagement of the clutch is accomplished as the pressure within the cylinder 108 is exhausted through orifice 242 and through the passage 132.

The clutch mechanism normally is engaged, as explained previously. The supply pump thus is necessary only in those instances when disengagement of the clutch is desired. During normal operation, therefore, the supply pump creates an undesirable power loss. To eliminate this loss, the valve land 114 and the passage 130 are arranged so that a direct connection is established between passage 134 and passage 130 at higher vehicle speeds when the governor valve element assumes a radially outward position. The discharge side of the pump then is exhausted into the low pressure exhaust region and the power then required to drive the pump is negligible. Its only function thereafter is to supply pressure for the lubricating system.

In a preferred embodiment of our invention, the supply pump is rendered inoperative (e.g., it becomes unloaded as its discharge side is connected to the low pressure lubrication circuit) at a speed of approximately 1600 r.p.m. The pump remains unloaded until the centrifugal force acting upon the governor valve element falls below the force of the spring 118. This may occur at about 600 r.p.m. Initially, of course, the governor valve element must overcome the opposing force of the spring as well as the hydraulic force of the supply pump pressure acting upon the upper end of the land 114. But after the supply pump is unloaded, the governor valve element must oppose only a single force; namely, the spring force.

The transducer 202 and the valve 198 function as a regulator valve. Higher clutch engagement speeds under cold weather operation are desired since the use of automatic or manual chokes during cold weather operation necessitates a higher engine idle speed. As explained previously, this variation in the initial engagement speed is accomplished by causing the spring load 200 to increase as the temperature decreases.

In FIG. 5, we have illustrated the relationship between engine speed and clutch engagement pressure during the clutch engagement period.

The forces that act upon the governor valve may be expressed as follows:

$$m\bar{r}^2 \leq F_s + (p_s - p_c) A \frac{\rho_0 \omega^2}{2} [A(r_4^2 - r_1^2) - A_0(r_3^2 - r_2^2)] \quad (1)$$

Let the bracketed quantity $$[A(r_4^2 - r_1^2) - A_0(r_3^2 - r_2^2)] = 2\xi$$

Then, $$m\bar{r} \leq F_s + (p_s - p_c) A + \rho_0 \xi \omega^2 \quad (1a)$$

Initially $p_s \equiv p_c$. Let the maximum speed at which $p_s = p_c$ be $\omega_0$. Thus, $$\omega_0^2 = \frac{F_s}{m\bar{r} - \xi \rho_0} \quad (2)$$

At some speed, $\omega_1$, the clutch pressure $p_c = 0$ $$\omega_1^2 = \frac{F_s + p_s A}{m\bar{r} - \xi \rho_0} \quad (3)$$

At intermediate speeds $$\omega^2 = \frac{F_s + (p_s - p_c) A}{m\bar{r} - \xi \rho_0}, \quad \omega_0 \leq \omega \leq \omega_1 \quad (4)$$

The clutch release pressure may be obtained directly from (4)

$$p_c = \frac{F_s - \omega^2 (m\bar{r} - \xi \rho_0)}{A} + p_s \quad (5)$$

Let the clutch pressure for initial engagement ($T_c = 0$) be $p_{ci}$. At WOT engine, let the stall pressure be $p_{cs}$ and the final engagement pressure be $p_{cf}$.

The engine speed, $\omega_i$, for initial engagement is found from (4)

$$\omega_i^2 = \frac{F_s + (p_s - p_{ci}) A}{m\bar{r} - \xi \rho_0} \quad (6)$$

The WOT stall speed, $\omega_s$, and the WOT final engagement speed, $\omega_f$, are obtained similarly as $$\omega_s^2 = \frac{F_s + (p_s - p_{cs}) A}{m\bar{r} - \xi \rho_0} \quad (7)$$

and $$\omega_f^2 = \frac{F_s + (p_s - p_{cf}) A}{m\bar{r} - \xi \rho_0} \quad (8)$$

In the foregoing analysis, m equals the mass of the governor valve element; $f$ equals the centrifugal force of the valve element; $\bar{r}$ equals the radius of the center of gravity of the governor valve element; $P_s$ equals the pressure of the pump; $P_c$ equals the release pressure for the clutch; $N_e$ equals engine speed; $r_1$ equals the radius of the inner edge of the land 116; $r_2$ equals the radius of the outer edge of the land 116; $r_3$ equals the radius of the inner edge of the land 114; and $r_4$ equals the radius of the outer edge of the land 114.

Having thus described a preferred form of our invention, what we claim and desire to secure by U.S. Letters Patent is:

1. An automatic clutch and control system for a power transmission mechanism comprising: a driving member, a gear system, a first friction element connected to said driving member, a second friction element connected to a power input member of said gear system, a spring means carried by one of said members for normally applying an engaging pressure to said friction elements, a fluid pressure servo carried by rotary portions of said clutch including a pressure operated part adapted to release said spring means, a source of fluid pressure, and governor valve means carried by said rotary portions including pressure distributor passages extending from said source to said servo for controlling release and supply of pressure from the latter in response to changing speed of said driving member whereby said friction elements will effect a smooth engagement upon an increase in the speed of said driving member, the pressure distributed to said servo acting upon said pressure operated part to create a pressure force thereon that opposes the force of said spring means, said governor valve means being disposed in and partly defining said distributor passages and including a movable element with a pressure area thereon in fluid communication with the pressure in said servo, the centrifugal force acting upon said movable element opposing the force on said movable element that is created by said servo pressure.

2. An automatic clutch and control system for delivering power from an engine to a driven member and comprising a gear system, a first friction element connected to said engine, a second friction element connected to a power input member of said gear system, a spring means carried by one of said members for normally applying an engaging pressure to said friction elements, a fluid pressure operated servo carried by rotary portions of said clutch including a pressure operated part adapted to release said spring means, a fluid pressure pump connected to said engine, a governor valve means carried by said rotary portions including pressure distributor passages extending from said source to said servo for controlling release and supply of pressure from the latter in response to changing speed of said driven member, the pressure distributed to said servo acting upon said pressure operated part and creating a pressure force thereon that opposes the force of said spring means, said governor valve means comprising a governor valve chamber, a governor valve element mounted within said chamber and adapted for radial movement in response to the centrifugal force acting on it, one of said passages extending from said pump to the radially outward region of said valve chamber, and a valve spring acting upon said valve element to urge it radially inwardly, said valve element responding to increasing engine speed to decrease progressively the degree of communication between said pump and said servo while simultaneously increasing the degree of communication between said servo means and a low pressure exhaust region.

3. An automatic clutch and control system for a power transmission mechanism, comprising: a driving member, a gear system, a first friction element connected to said driving member, a second friction element connected to a power input member of said gear system, spring means carried by one of said members for normally applying an engaging pressure to said friction elements, a fluid pressure servo carried by rotary portions of said clutch including a pressure operated part adapted to release said spring means, a source of fluid pressure, a governor valve means carried by said rotary portions including pressure distributor passages extending from said source to said servo for controlling release and supplying of pressure from the latter in response to changing speed of said driving member, the pressure distributed to said servo acting upon said pressure operated part and creating a pressure force thereon that opposes the force of said spring means, said governor valve means being disposed in and partly defining said distributor passages and including a movable element with a pressure area in fluid communication with the pressure in said servo, the centrifugal force acting upon said movable element opposing the force on said movable element that is created by said servo pressure, whereby said clutch will effect a smooth engagement upon an increase in the speed of said driving member, manually operated elements adapted to condition said mechanism for a speed ratio change, a shift valve means situated in said passages for interrupting and establishing a connection between said source and said governor valve means, and shift control means responsive to movement of one of said manually operated elements for controlling said shift valve means, said passages including a portion extending directly from said shift valve means to said servo, said shift valve means functioning in response to shifting movement of said manually operable member during a speed ratio change to establish a direct connection between said source and said servo.

4. An automatic clutch and control system for a power transmission mechanism, comprising: a driving member, a gear system, a first friction element connected to said driving member, a second friction element connected to a power input member of said gear system, spring means carried by one of said members for normally applying an engaging pressure to said friction elements, a fluid pressure servo carried by rotary portions of said clutch including a pressure operated part adapted to release said spring means, a source of fluid pressure, governor valve means carried by said rotary portions including pressure distributor passages extending from said source to said servo for controlling release and supply of pressure from the latter in response to changing speed of said driving member whereby said clutch will effect a smooth engagement upon an increase in the speed of said driving member, the pressure distributed to said servo acting upon said pressure operated part and creating a pressure force thereon that opposes the force of said spring means, manually operated elements adapted to condition said mechanism for a speed ratio change, a shift valve means situated in said passages for interrupting and establishing a connection between said source and said governor valve means, shift control means responsive to movement of one of said manually operated elements for controlling said shift valve means, said passages including a portion extending from said shift valve means to said servo, said shift valve means functioning in response to shifting movement of said one manually operated element during a speed ratio change to establish a connection between said source and said servo, one portion of said shift valve means comprising a valve element slidably situated within a valve chamber, one end of said valve chamber communicating with a low pressure fluid supply region, a branch passage extending from said one end of said valve chamber to said passage portion, and check valve means in communication with said one end of said valve chamber for permitting flow of supply fluid to said valve chamber when said valve element moves in one direction and for distributing fluid from said one end of said valve chamber when said valve element moves in the other direction, and manually controlled means for actuating said valve element to establish a pumping action to release said clutch independently of the pressure of said source.

5. An automatic clutch and control system for delivering power from an engine to a driven member comprising a gear system, a first friction element connected to said engine, a second friction element connected to a power input member of said gear system, spring means carried by one of said members for normally applying an engaging pressure to said friction elements, a fluid pressure operated servo carried by rotary portions of said clutch including a pressure operated part adapted to release said spring means, a fluid pressure pump connected to said engine, a governor valve means carried by said rotary portions including pressure distributor passages extending from said source to said servo for controlling release and supply of pressure from the latter in response to changing speed of said driven member, the pressure distributed to said servo acting upon said pressure operated part and creating a pressure force thereon that opposes the force of said spring means, said governor valve means comprising a governor valve chamber, a governor valve element mounted within said chamber and adapted for radial movement in response to the centrifugal force acting on it, one of said passages extending from said pump to the radially outward region of said valve chamber, a valve spring acting upon said valve element to urge it radially inwardly, said valve element responding to increasing engine speed to decrease progressively the degree of communication between said pump and said servo while simultaneously increasing the degree of communication between said servo means and the low pressure exhaust region, and temperature responsive regulator valve means for increasing the magnitude of the pressure maintained by said source as the temperature of said engine decreases to permit an increase in the speed at which engagement of said clutch is accomplished.

6. An automatic clutch and control system for a power transmission mechanism, comprising: a driving member, a gear system, a first friction element connected to said driving member, a second friction element connected to a power input member of said gear system, spring means carried by one of said members for normally applying an engaging pressure to said friction elements, a fluid pressure servo carried by rotary portions of said clutch including a pressure operated part adapted to release said spring means, a source of fluid pressure, governor valve means carried by said rotary portions including pressure distributor passages extending from said source to said servo means for controlling release and supply of pressure from the latter in response to changing speed of said driving member whereby said clutch will effect a smooth engagement upon an increase in the speed of said driving member, the pressure distributed to said servo acting upon said pressure operated part and creating a pressure force thereon that opposes the force of said spring means, manually operated elements adapted to condition said mechanism for a speed ratio change, a shift valve means situated in said passages for interrupting and establishing a connection between said source and said governor valve means, shift control means responsive to movement of one of said manually operated elements for controlling said shift valve means, said passages including a portion extending from said shift valve means to said servo, said shift valve means functioning in response to shifting movement of said one manually operated element to establish a connection between said pump and said servo, and temperature responsive regulator valve means for increasing the magnitude of the pressure maintained by said source as the temperature of said engine decreases to permit an increase in the speed at which engagement of said clutch is accomplished.

References Cited by the Examiner

UNITED STATES PATENTS

| 2,057,744 | 10/36 | Sanford. | |
| 2,189,680 | 2/40 | Sandford | 192—3.5 |
| 2,189,681 | 2/40 | Sandford et al. | 192—3.5 |
| 2,203,296 | 6/40 | Fleischel. | |
| 2,204,872 | 6/40 | Thompson. | |
| 2,328,092 | 8/43 | Nutt et al. | |

DAVID J. WILLIAMOWSKY, *Primary Examiner.*